US00RE40151E

(19) United States
(12) Reissued Patent
Shei et al.

(10) Patent Number: US RE40,151 E
(45) Date of Reissued Patent: Mar. 18, 2008

(54) MERCHANDISER FOR WARM AND COLD FOODS

(75) Inventors: Steven M. Shei, Fort Wayne, IN (US); Clement J. Luebke, Hudson, FL (US)

(73) Assignee: Duke Manufacturing Company, St. Louis, MO (US)

(21) Appl. No.: 10/314,926

(22) Filed: Dec. 9, 2002

Related U.S. Patent Documents

Reissue of:
(64) Patent No.: 6,257,010
Issued: Jul. 10, 2001
Appl. No.: 09/419,263
Filed: Oct. 11, 1999

(51) Int. Cl.
*A47F 3/04* (2006.01)
*F25B 29/00* (2006.01)

(52) U.S. Cl. ..... 62/252; 165/48.1; 165/58; 62/249

(58) Field of Classification Search ..... 62/252, 62/249, 258; 165/48.1, 58, 61, 63, 64
See application file for complete search history.

(56) References Cited

U.S. PATENT DOCUMENTS

| | | | | | |
|---|---|---|---|---|---|
| 1,984,138 | A | * | 12/1934 | Kennedy | 312/118 |
| 2,631,912 | A | * | 3/1953 | Pryor, Sr. | 312/139.1 |
| D201,756 | S | * | 7/1965 | Delay | 312/114 |
| D209,722 | S | * | 12/1967 | Mangini | 33/41.4 |
| 3,841,440 | A | | 10/1974 | Weddendorf | |
| 4,027,727 | A | * | 6/1977 | Pullens | 165/48.1 |
| 4,250,955 | A | | 2/1981 | Plattner et al. | |
| 4,343,985 | A | | 8/1982 | Wilson et al. | |
| D276,578 | S | * | 12/1984 | Kwiecinski | 431/122 |
| 4,704,870 | A | * | 11/1987 | Beitner | 62/3.62 |
| 4,836,622 | A | | 6/1989 | Ferguson | |
| 4,884,626 | A | * | 12/1989 | Filipowski | 165/231 |
| 4,949,554 | A | | 8/1990 | Branz et al. | |
| D312,363 | S | * | 11/1990 | Faggioli | 248/188 |
| D321,800 | S | * | 11/1991 | Blum | 52/96 |
| 5,203,180 | A | | 4/1993 | Weisbrich | |
| 5,247,807 | A | * | 9/1993 | Jarman et al. | 62/227 |
| D352,620 | S | * | 11/1994 | Geisen et al. | 48/213 |
| 5,590,541 | A | | 1/1997 | Rainwater | |
| 5,743,098 | A | * | 4/1998 | Behr | 62/80 |
| 6,153,857 | A | * | 11/2000 | Gunnels | 219/386 |
| 6,315,039 | B1 | * | 11/2001 | Westbrooks et al. | 165/201 |
| 6,412,296 | B1 | | 7/2002 | Rossi | |
| 6,705,107 | B2 | | 3/2004 | Schlosser et al. | |

FOREIGN PATENT DOCUMENTS

| | | | |
|---|---|---|---|
| DE | 33 37 467 A1 | | 4/1985 |
| EP | 0502574 A1 | * | 9/1992 |

* cited by examiner

*Primary Examiner*—Mohammad M. Ali
(74) *Attorney, Agent, or Firm*—Senniger Powers

(57) ABSTRACT

A merchandiser that is capable of holding and displaying both cold foods and warm foods includes a cold pan which has walls that are recessed into the top of a counter to provide a cold compartment that opens out of the counter top. The cold foods occupy the cold compartment. In addition, the merchandiser has a closure assembly which rises upwardly form the cold pan and includes side walls that support a shelf above the cold pan and also housing above the shelf. Front and rear doors are attached to the side walls to close the space between the shelf and housing at the front and rear, respectively, of the closure assembly, so that the doors, the side walls, and shelf and the housing enclose a warm compartment that holds and displays warm foods. Both doors pivot about horizontal axes to provide access to the warm compartment. The housing contains a fan and heating element for circulating heated air through the warm compartment. A refrigerator unit within the counter includes an evaporator coil that lies along the walls of the cold pan.

42 Claims, 6 Drawing Sheets

MERCHANDISER FOR WARM AND COLD FOODS

Matter enclosed in heavy brackets [ ] appears in the original patent but forms no part of this reissue specification; matter printed in italics indicates the additions made by reissue.

BACKGROUND OF THE INVENTION

This invention relates in general to the storage and presentation of foods, and more particularly a merchandiser for displaying warm and cold foods.

Traditional restaurants use menus to inform patrons of the foods which are available for consumption on the premises of such restaurants. Cafeterias, on the other hand, actually display the foods for the patrons to observe and select. While cafeteria displays may stimulate sales, cafeterias lines are not for all restaurants. Not only do they occupy considerable space, but they often detract from the ambience that a restaurateur may seek to present. Yet the actual display of foods stimulates the sale of such foods, and this holds particularly true for pies, salads and confections—foods which might not otherwise be purchased with traditional meal orders.

Merchandisers in the form of cabinets exist for displaying one type of food or another, but rarely different types of foods. One never finds warm and cold foods displayed together, obviously by reason of the different temperatures at which they must be held.

SUMMARY OF THE INVENTION

The present invention resides a merchandiser that has a cold compartment and a warm compartment, with the latter being supported on side walls where it is elevated above the cold compartment. The warm compartment is enclosed and is heated by a heating unit located within it.

BRIEF DESCRIPTION OF THE SEVERAL VIEWS OF THE DRAWINGS

In the accompanying drawings which form part of the specification and wherein like numerals and letters refer to like parts wherever the occur.

DETAILED DESCRIPTION OF THE INVENTION

Figure 1:
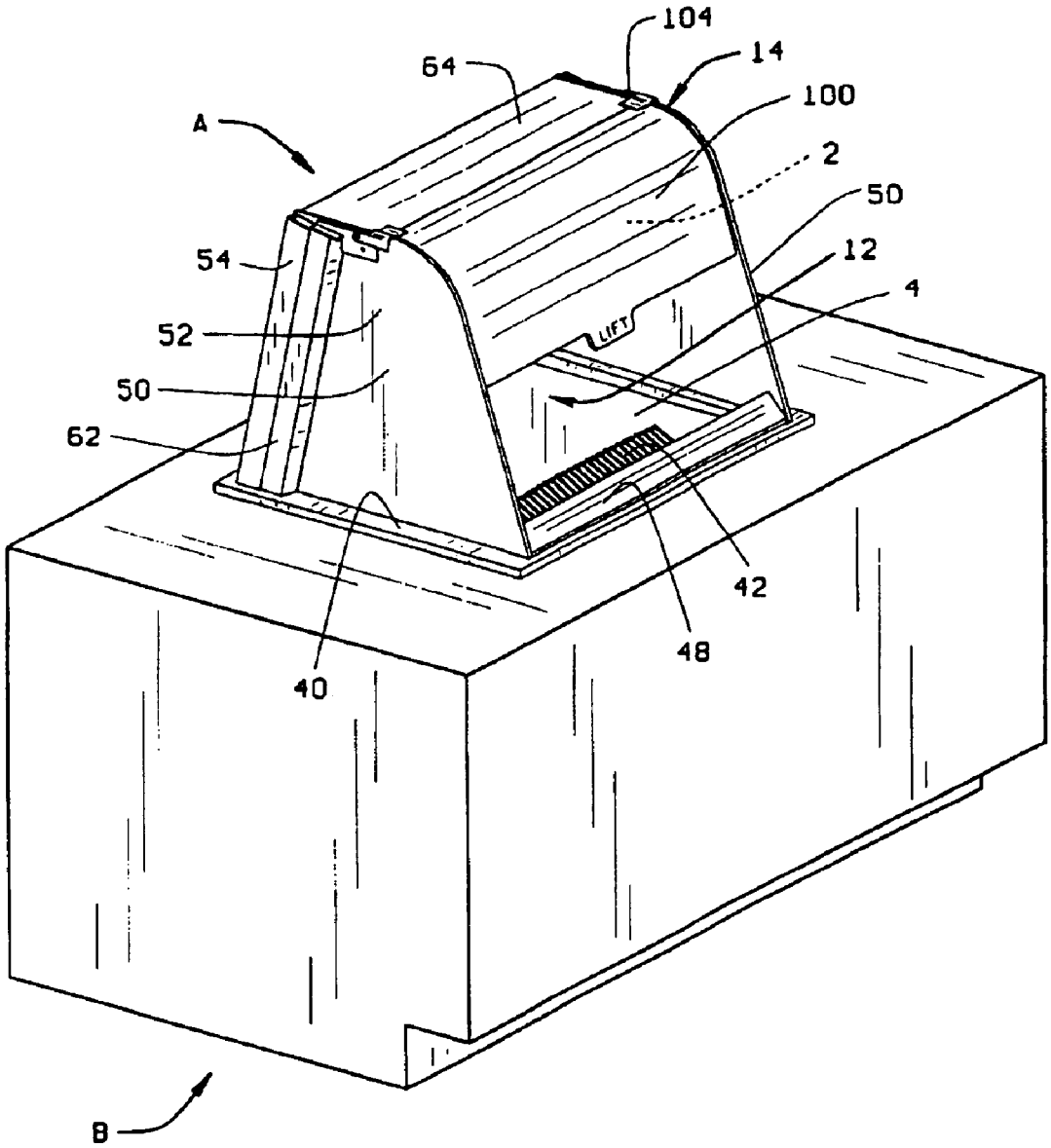
FIG. 1 is a perspective view of a merchandiser constructed in accordance with and embodying the present invention, with the merchandiser being installed in a counter.
Figure 2:
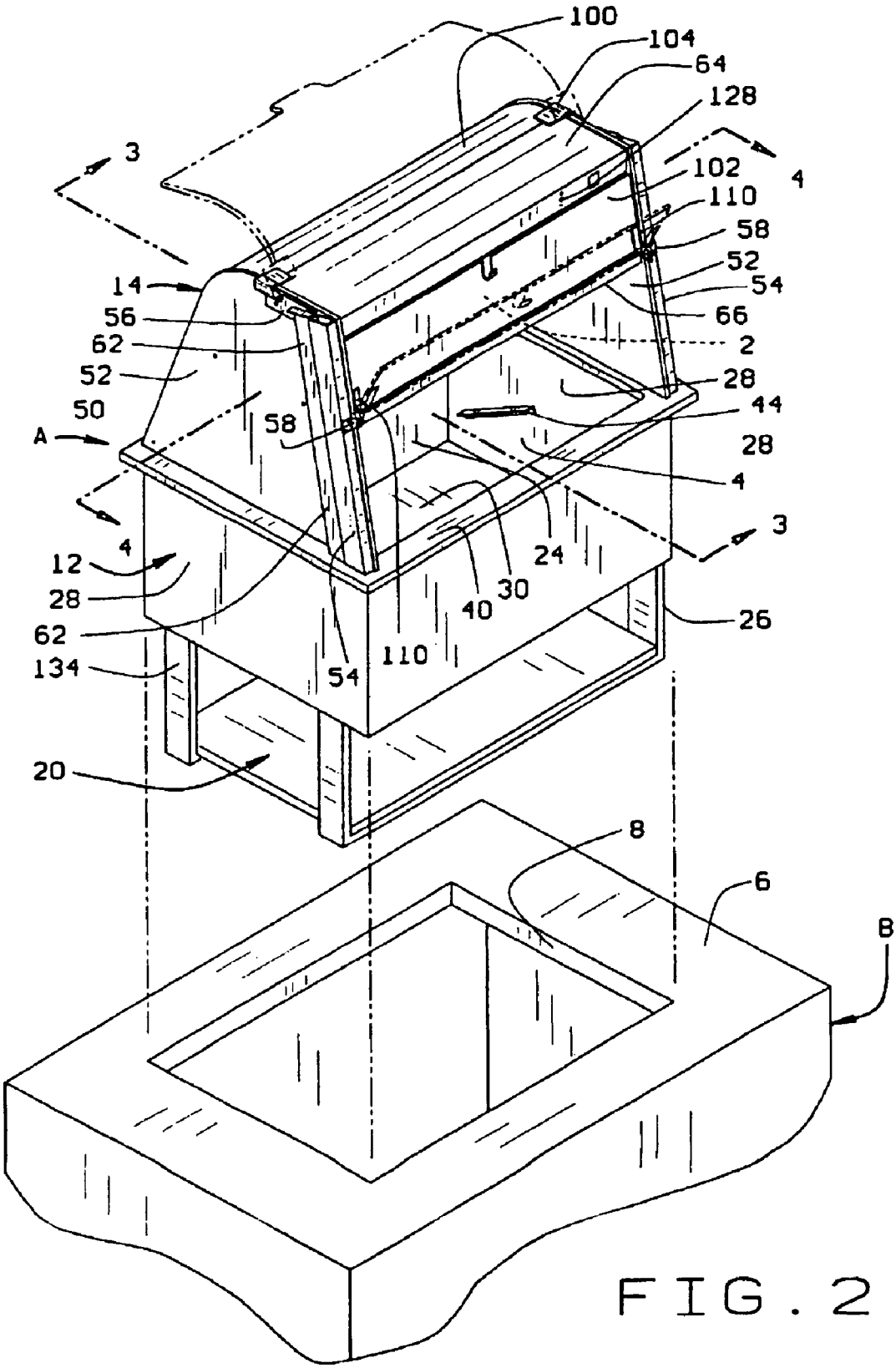
FIG. 2 is another perspective view of the merchandiser elevated from the counter in which it is normally mounted; but with its wire shelf and racks removed.

Referring now to the drawings, a merchandiser A (FIGS. 1 and 2) contains an upper or warm compartment 2 which holds warm foods and a lower or cold compartment 4 which holds cold foods. Both compartments 2 and 4 are fully visible from the front and sides of the merchandiser A as are the foods that are within them. Thus, the compartments 2 and 4 display the foods, and the display is enhanced with illumination from within the merchandiser A. Moreover, each compartment 2 and 4 is fully accessible from the exterior of the merchandiser A so that individuals at the merchandiser A may withdraw foods that are displayed within the two compartments 2 and 4. Actually, the merchandiser A rests on a counter B having a top 6 provided with a cutout 8. A portion of the merchandiser A is recessed into the countertop 6 at the cutout 8, while the remainder of it rises above the top 6.

Figure 5:
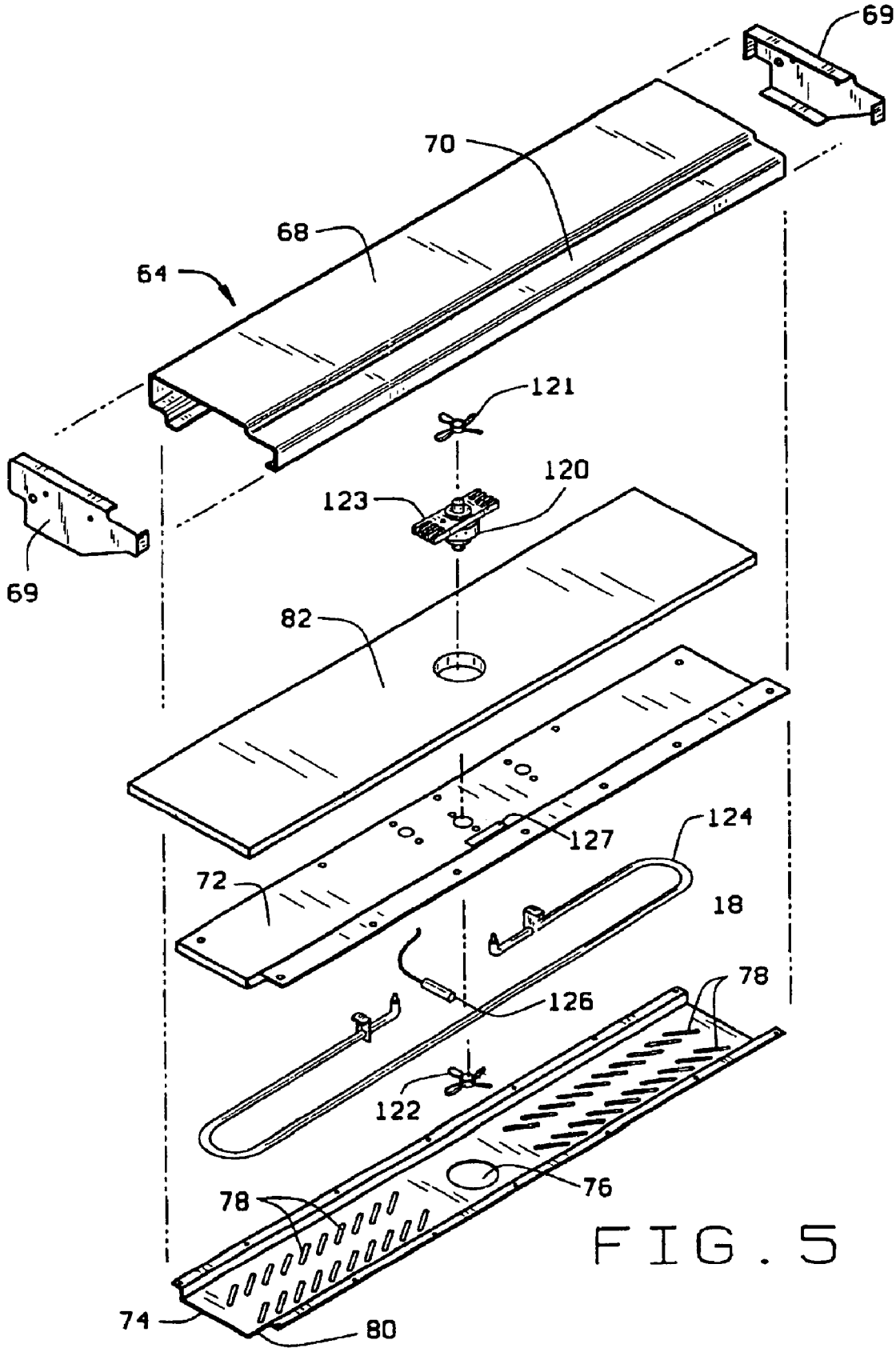
FIG. 5 is an exploded perspective view of the housing that closes the upper compartment for the merchandiser and of the heating unit that is within the housing.
Figure 6:
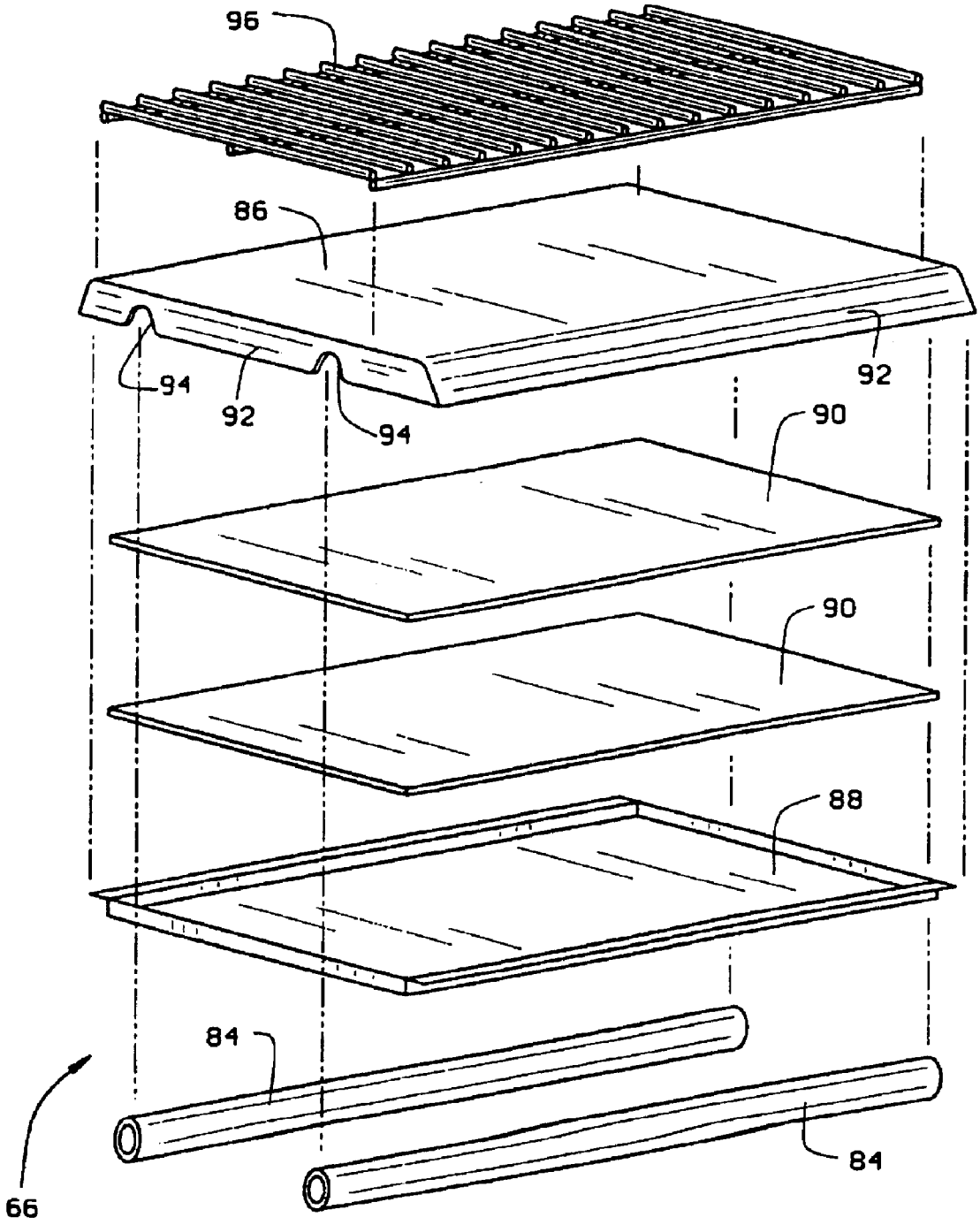
FIG. 6 is an exploded perspective view of the shelf that closes the bottom of the upper compartment.

The merchandiser A includes (FIGS. 1 and 2) a cold pan 12 which fits into the cutout 8 in the countertop 6, and a closure assembly 14 which rises upwardly from the cold pan 12 and encloses the upper compartment 2, spacing it from the lower compartment 4. In addition, the merchandiser A has a heating unit 18 (FIG. 5) which is supported in the closure assembly 14 along the upper region of the upper compartment 2. It draws air from the upper compartment 2, heats the air, and then recirculates the heated air through the compartment 2. Finally, the merchandiser A has a refrigeration unit 20 which is located within the counter B where it is attached to and supported on the cold pan 12. The refrigerator unit 20 cools the cold pan 12 and maintains the lower compartment 4 at a temperature less than ambient.

The cold pan 12 fits into the cutout 8 in the top 6 of the counter B and lies within the counter B. It includes (FIGS. 3 and 4) spaced apart front and back walls 24 and 26 which are vertical, side walls 28 which join the ends of the front and back walls 24 and 26 and are likewise vertical, and a bottom wall 30 which is joined to the lower margins of the front and back walls 24 and 26 and to the lower margins of the side walls 28. The walls 24, 26, 28 surround the lower comportment 4, while the bottom wall 30 closes the bottom of the compartment 4. The top of the lower compartment 4 is open, so that the compartment 4 opens upwardly into the closure assembly 14. Actually, each of the walls 24, 26, 28 and 30 consists of inner and outer panels 32 and 34 which are spaced about 1.0 inches apart and a thermal insulation 36 that is located between the panels 32 and 34. The inner panels 32 for each of the walls 24, 26, 28 and 30 are joined as are the outer panels 34, so the joined together inner panels 32 form a liner, while the joined outer panels 34 form an exterior shell. The insulation 36 is preferably polyurethane which is formed in place. The bottom wall 30 contains a drain 38 through which water may be released from the cold pan 12. Finally, the cold pan 12 has a flange 40 to which the upper margins for the inner and outer panels 32 and 34, for the front and back walls 24 and 26 and for the side walls 28 are attached. The flange 40 overlies the top 6 of the counter B immediately around the cutout 8.

The cold pan 12 contains a shelf 42 (FIG. 3), in the form of a wire grid which rests on angle brackets 44 that are secured to the inner panels 32 of the side walls 28. The shelf 42 lies along the front wall 24, from which it is inclined rearwardly and upwardly to the mid-region of the pan 12. The bottom wall 30 supports racks 46, likewise in the form of wire girds, and they separate the foods that are placed on it from the cold inner panel 32 of the bottom wall 30. The flange 40 along the front wall 24 has a menu bar 48 attached to it for presenting cards which display prices and other information at a convenient angle for viewing by one standing in front of the merchandiser A.

The closure assembly 14 rests on the cold pan 12 from which it projects upwardly, it being the portion of the merchandiser A which is exposed above the top 6 of the counter B. The closure assembly 14 includes (FIGS. 2 and 4) side walls 50 which are attached to the segments of the flange 40 that overlie from the side walls 28, and bottom wall 30 of the cold pan 12. The side walls 50 rise upwardly from these segments. Each includes a side panel 52 which is preferably formed from a sturdy transparent material, such as plastic or glass: The panel 52 at its lower end is about as wide as the cold pane 12, but its front and rear edges slope and converge toward a horizontal top edge, the front edge being at a greater inclination than the rear edge. The front edge merges with the top edge along a generally arcuate edge. In addition, each side wall 50 has a tubular post 54 which extends upwardly along the outside face of the panel 52, with its rearwardly presented face being along the slightly inclined rear edge of the panel 52. The post 54, which is fastened firmly to the flange 40 of the cold pan 12 and also to the panel 52, extends from the flange 40 to near the horizontal top edge of the panel 52. At its upper end, the post 54 is fitted with a hinge bracket 56 which extends forwardly along the outside face of the panel 52, its upper margin being flush with the horizontal upper edge of the panel 52. Intermediate its ends the end post 54 is fitted with another hinge braket 58 which projects inwardly across the rear edge of the adjacent panel 52. The posts 54 rigidify the panels 52 and further serve as a conduit for the electrical wiring that leads to the heating unit 18. Apart from that, each post 54 carries a thin fluorescent lamp 60 which extends along its forwardly presented face and of course along the outside face of the adjacent panel 52 as well. The lamp 60 illuminates the two compartments 2 and 4 of the merchandiser A. Each lamp 60 is enclosed in a lamp shield 62 that is attached to the post 54 along which the lamp 60 extends, with the attachment being such that the shield 62 may be removed to replace the lamp 60.

The closure assembly 14 also includes a housing 64 (FIGS. 2 and 5) and a shelf 66, both of which extend between the two side walls 50, the former above the latter. The housing 64 includes a main panel 68 in the form of an inverted channel and end caps 69 which close the ends of the inverted channel. The end caps 69 are attached to the hinge brackets 56 that are on the upper ends of the posts 54 for the two side walls 50. The top of the panel 68 is generally planar and lies flush with upper edges of the panels 52 for the side walls 50. But the main panel 68 along its front contains a recess 70 (FIG. 5) which is somewhat depressed from the upper edge of the panel 52. It opens both upwardly and forwardly, taking the form of a rabbet.

In addition, the housing 64 includes a motor panel 72 that fits within the main panel 68 and an intake panel 74 which is attached to the main panel 68 and closes the bottom of the inverted channel formed by the main panel 68. The intake panel 74 for the most part is horizontal and within its horizontal region it contains a circular intake opening 76 which is located midway between its ends and discharge slots 78 which are located beyond the intake opening 76 on both sides of the opening 76. But the panel 74 has a beveled segment 80 (FIGS. 3 and 4) which is presented forwardly and contains more discharge slots 78 (FIG. 4). Preferably, all three panels 68, 72 and 74 of the housing 64 are formed from metal sheet, such as stainless steel, that will resist corrosion. Finally, the housing 64 contains a thermal insulation 82 which rests on the motor panel 72, yet is separated from the top of the main panel 68.

Whereas, the housing 64 closes the top of the upper compartment 2, the shelf 66 closes the bottom of the compartment 2. It rests on cross rails 84 (FIG. 3) that extend between the two side walls 50. Actually, the ends of the rails 84 are attached firmly to the panels 52 of the side walls 50 with machine screws which pass through the panels 52 and thread into the ends of the rails 84. Not only do the rails 84 support the shelf 66, but they also rigidify the closure assembly 14.

The shelf 66 includes a top panel 86, a bottom panel 88 and thermal insulation 90 located between the two panels 86 and 88. The top panel 86 is turned downwardly along edges in the form of flanges 92, and the flanges 92 at the ends of the panel 86 contain arcuate notches 94 which open downwardly and receive the cross rails 84, thereby positioning the shelf 66 on the rails 84 so that is does not slide forwardly or rearwardly. The lower panel 88 fits within the flanges 92 of the top panel 86 and the insulation 90 is captured between the two panels 86 and 88. The main panel 86 of the shelf 66 supports a wire rack 96 which elevates foods slightly off the shelf 66 and thereby allows warm air to circulate under the foods.

The shelf 66 may also be formed in a single piece form a polymer, either in an injection molding procedure or a vacuum forming procedure. The polymer serves as thermal insulation, eliminating the need for the separate insulation 90. In addition, the closure assembly 14 has (FIG. 3) a front door 100 and a rear door 102, both of which, when closed, isolate the upper comportment 2, but when open afford access to the compartment 2. Both doors 100 and 102 are formed from a transparent material such as plastic or glass. When the front door 100 is closed, its upper end lies within the recess 70 of the main panel 68 for the housing 64, so that its exterior surface is flush with the adjoining top surface of the main panel 68 and forms a continuation of that surface. From there, the front door 70 curves downwardly, following the output of curved edges on side panels 52, although lying inwardly from the panels 52. Beyond the curvature the door 100 continues downwardly following the straight, but inclined, front edges of the side panels 52. It terminates at the shelf 66. At its upper end, the front door 100 has hinge brackets 104 (FIG. 2) which are connected to the hinge brackets 56 on the posts 54 by pivot pins which form a pivot axis that extends behind the recess 70. Along its bottom edge the front door 100 has a handle 108. When one grasps the handle 108 and lifts, the door 100 swings upwardly about the axis of the pivot pins and exposes the upper compartment 2. In the alternative the front door 100 may descend past the shelf 66 to the flange 40 on the cold pan 12 and be secured, so that the compartments 2 and 4 are accessible only from the rear of the closure assembly 14.

Figure 3:
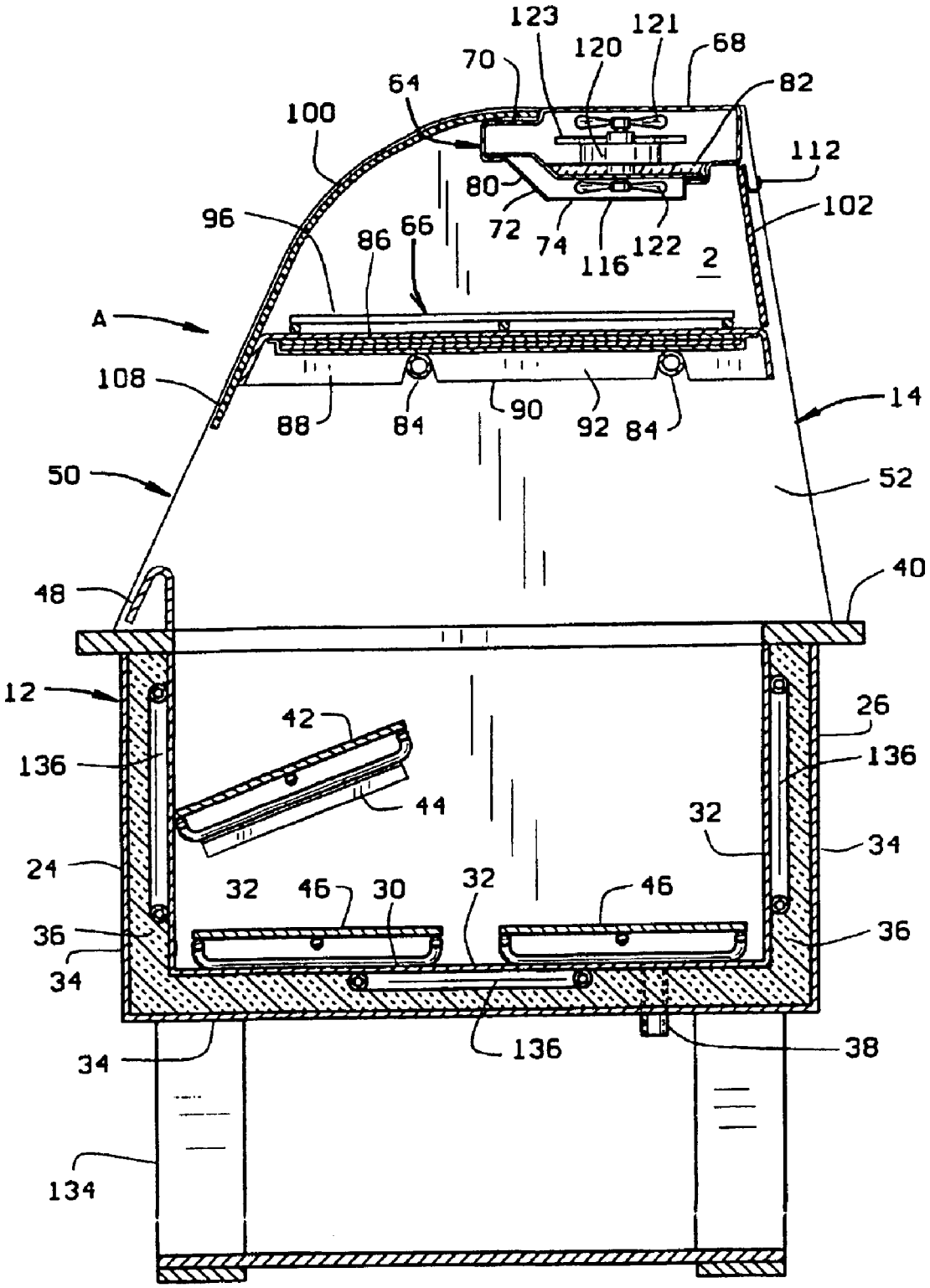
FIG. 3 is a sectional view taken along line 3-3 of FIG. 2.
Figure 4:
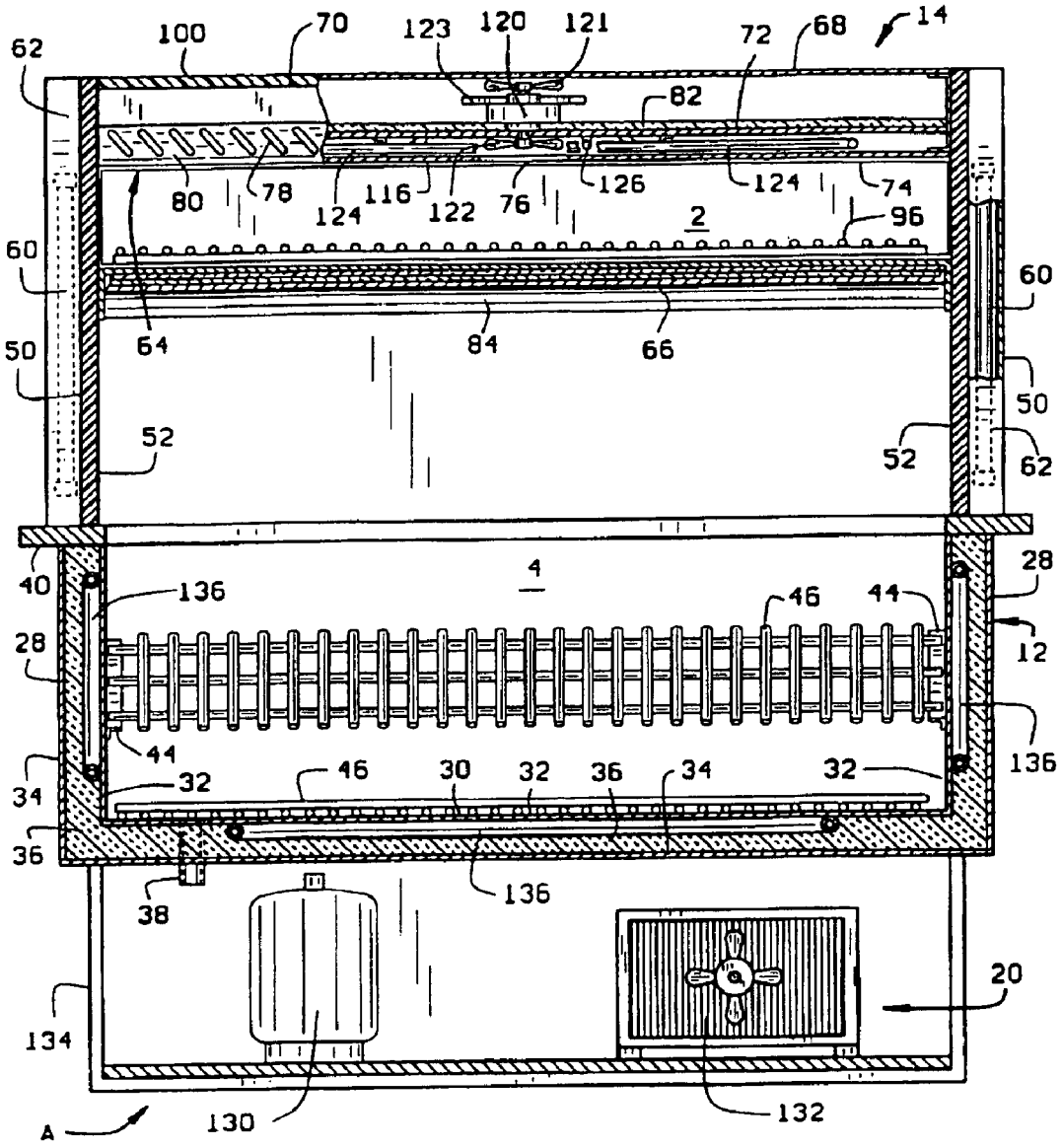
FIG. 4 is a sectional view taken along line 4-4 of FIG. 2.

The rear door 102 is flat and, when closed, lies between the two side panels 52 at the slightly inclined rear edges of those panels 52 (FIG. 3). It closes the area between the housing 64 on the top and the shelf 16 on the bottom. At its lower end the rear door 102 has hinge brackets 110 (FIG. 2) which are connected to the hinge brackets 58 on the posts 54 through pivot pins which establish a pivot axis that runs along the rear edge of the shelf 66. Along its upper edge the rear door 102 has a handle 112. Normally, the rear door 102 lies between the side panels 52 at the inclined rear edges of those panels 52 with its upper end resting against the main panel 68 of the housing 66. When one grasps the handle 112 and pulls, the rear door 72 swings outwardly and downwardly and exposes the upper compartment 2.

The main panel 68 and the intake panel 74 enclose a plenum 116 (FIGS. 3 and 4) within the housing 64, and the plenum 116 contains the heating unit 18. The heating unit 18 includes (FIG. 5) a fan motor 120 which rests on the motor panel 72 to which it is secured. The motor 120 rotates an upper fan 121, which is located in the space between the top of the main panel 86 and the insulation 90, and a lower fan 122, which is located beneath the motor panel 72 and immediately behind the circular intake opening 76 in the intake panel 74. The motor 120 also has a heat sink 123 projecting laterally from it into the space between the top of the main panel 86 and the insulation 90. The upper fan 121 circulates air in this space, and that air passes over the heat sink 123 to dissipate heat from the heat sink 123 and motor 120. The lower fan 122 draws air from the upper compartment 2 through the opening 76 into the plenum 116 where the air is directed laterally through the plenum 116 to be discharged through the slots 78 back into the upper compartment 2. As the air moves laterally through the plenum 116 it passes over a heating element 124 of the electrical resistance type which is attached to the motor panel 72 on each side of the fan motor 120.

The motor panel 72 also carries a temperature sensor 126 (FIG. 4) which is located next to the fan 122 so that the air discharged by the fan 122 passes over the sensor 126 before encountering the nearby heating element 124. In effect, the sensor 126 measures the temperature of the air within the upper compartment 2. The panel 72 also carries a high limit sensor 127 which will effect an interruption of the electrical circuit to the heating element 124 when the temperature of the panel 72 and the air around it exceeds a prescribed maximum. Finally, the heating unit 18 contains a control 128 (FIG. 2) for setting the temperature at which the heating unit 18 maintains the temperature of the air within the upper compartment 2, and the control 128 is accessible at the back of the housing 64.

The refrigeration unit 20 includes (FIG. 4) a compressor 130 and a condenser 132, both of which are located below the cold pan 12 on a frame 134 that is suspended from the cold pan 12. In addition, the refrigeration unit 20 has a refrigerator conduit in the form of an evaporator coil 136 (FIGS. 3 & 4) which extends in a serpentine configuration along the inner panels 32 for the front wall 24, back wall 26, side walls 28 of the cold pan 12. The insulation 36 lies behind the evaporator coil 136 so the inner panels 32 of the walls 24, 26 28 and 30 exist at a temperature considerably less than the outer panels 34. The compressor 130 of course, compresses a refrigerant while it is in a gaseous state, and thus elevates the temperature of the refrigerant. While at an elevated temperature, the refrigerant enters the condenser 132 where it transforms into a liquid, loosing heat as it does. The high pressure liquid passes through an expansion valve where it expands and reverts to a gaseous state. The gaseous refrigerant, having expanded, exists at a temperature less than ambient. The low temperature refrigerant flows through the evaporate or coil 136 and extracts heat from the cold pan 12, thus reducing the temperature of the lower compartment 4 below ambient.

In use, the merchandiser A rests on the counter B with its upper compartment 2 elevated somewhat above the countertop 6 and its lower compartment 4 recessed into the counter B. The heating unit 18 elevates the temperature of the upper compartment 2, with the heat being supplied by the heating elements 124 in the plenum 116 of the housing 64. The fan 122 continually circulates the heated air through the compartment 2. The refrigeration unit 20, on the other hand, maintains the temperature of the air within the lower compartment 4 below ambient temperature.

The restaurant, or other establishment in which the merchandiser A is used, displays both cold and hot foods in the merchandiser A. The cold foods are arranged on the shelf 42 within the cold pan 12 and racks 46 at the bottom of the cold pan 12 as well. Indeed, the racks 46 separate the foods at the bottom of the lower compartment 4 from the inner panel 32 of the bottom wall 30 and keep foods from freezing against the panel 32. Hot foods, on the other hand, are spread over the shelf 66 at the bottom of the upper compartment 2.

Typically, the foods on displays in the merchandiser A are desserts and salads. Some, such as pies and pastries, are preferably served warm, while others, such as confections and salads, are usually served cold. Juices and water are also usually served cold. The patron may actually remove a selected food time from the merchandiser A or simply identify it and le an employee of the restaurant remove it. One simply reaches into the cold compartment 4 to remove a refrigerated food item from it, in that the cold compartment is unobstructed as its front and rear as well. To remove a warm food item from the upper compartment 2 one must lift the front door 100 which thereupon pivots upwardly at its hinge brackets 56 and 104. Restaurant employees resupply the lower compartment 4 by simply placing food items in it, usually from the rear. After all, the lower compartment 4 is exposed between the side walls 50 at both the front and rear of the merchandiser A. Restaurant employees resupply the upper compartment 2 with food items by lowering the rear door 72 which pivots downwardly at its hinge brackets 58 and 110. In any event, the upper compartment 2 is normally enclosed on its top by the housing 64, on its bottom by the shelf 66, on its sides by the panels 52 of the side walls 50, at its back by the rear door 102, and at its front by the front door 100, all of which in a board sense constitute walls. However, by extending the front door 100 downwardly to the flange 40 of the cold pan 12 and securing it, access to both compartments 2 and 4 may be restricted to only employees. The panel 52 and front door 100 are transparent and the compartment 2 is illuminated with the lamps 60, so that the heated foods within it are highly visible to one standing in front of the cabinet A and even to the sides of the cabinet A. The complete enclosure of the upper compartment 2 remains the heated air within that compartment 2, thus placing minimum demands on the heating unit 18.

This invention is intended to cover all changes and modifications of the example of the invention herein chosen for purposes of the disclosure which do not constitute departures from the spirit and scope of the invention.

What is claimed is:

1. A merchandiser for holding food, said merchandiser having a front and back and sides and comprising: first walls located around a first compartment such that the first compartment is closed along its front, back, sides, and bottom, but opens upwardly; second walls completely enclosing a second compartment that is located above and spaced from the open top of the first compartment, such that the first compartment is accessible beneath the second compartment at both the front and the back of the merchandiser, at least one of the second walls being movable with respect to others of the second walls to provide access to the second compartment, at least one of the second walls being transparent to permit observation of food in the second compartment; a refrigeration unit for cooling the first compartment; and a heating unit for heating the air that is in the second compartment.

2. A merchandiser for displaying foods, said merchandiser comprising a cold pan having vertical walls that surround a cold compartment and a bottom wall connected to the vertical walls and extending across the bottom of the cold compartment; a closure assembly located above the cold pan and including spaced apart side walls rising upwardly from the cold pan, a shelf supported on the side walls above the cold compartment and spaced from the cold pan, a housing supported on the side walls above the shelf and enclosing a plenum, the housing containing an inlet and an outlet opening, a front wall and a back wall extending between the side walls and between the shelf and housing, so that the front and back walls together with the shelf, the housing and the side walls enclose a warm compartment into which the openings in the housing open, at least one of the front and back walls being movable to provide access to the warm compartment; a heating unit including a fan located in the plenum of the housing for withdrawing air from the warm compartment through the inlet opening and discharging it back into the warm compartment through the outlet opening, and a heating element located in the plenum for heating the air as it passes through the plenum; and a refrigeration unit having, conduits located along at least some of the walls of the cold pan.

3. In combination with a counter having a countertop provided with an opening, a merchandiser supported on the counter for displaying foods, said merchandiser comprising a cold pan located generally within the counter and opening upwardly out of the countertop at the opening in the countertop; side walls rising upwardly above the countertop; a shelf supported by the side walls above and spaced from the cold pan, a housing supported by the side walls above the shelf and enclosing a plenum, the housing having inlet and outlet openings, front and back walls extending between the shelf and housing and between the side walls so that the front and back walls together with the housing, shelf and side walls enclose a warm compartment; a heating element in the plenum of the housing for elevating the temperature of air that passes into the plenum at the inlet opening, thence through the plenum, and then out the plenum at the outlet opening; and a conduit located along at least one wall of the cold pan for containing a fluid at a temperature below that of the cold pan.

4. A merchandiser for displaying foods, said merchandiser comprising a cold pan having vertical walls that surround a cold compartment and a bottom wall connected to the vertical walls and extending across the bottom of the cold compartment; a closure assembly located above the cold pan and including spaced apart side walls rising upwardly from the cold pan; the side walls including posts which extend upwardly from the cold pan and transparent panels through which one can observe the cold compartment; a shelf supported on the side walls above the cold compartment and spaced from the cold pan, a housing attached to the posts of the side walls and supported on the side walls above the shelf to enclose a plenum, the housing containing an inlet and an outlet opening; a transparent front wall and a back wall extending between the side walls and between the shelf and housing, so that the front and back walls together with the shelf, the housing and the side walls enclose a warm compartment into which the openings in the housing open, the front wall being movable to provide access to the warm compartment and being hinged near its top, so that when moved, it pivots upwardly; and a heating unit including a fan located in the plenum of the housing for withdrawing air from the warm compartment through the inlet opening and discharging it back into the warm compartment through the outlet opening and a heating element located in the plenum for heating the air as it passes through the plenum.

5. In combination with a counter having a countertop provided with an opening, a merchandiser supported on the counter for displaying foods, said merchandiser comprising a cold pan located generally within the counter and opening out of the countertop at the opening in the countertop; side walls attached to the cold pan and rising upwardly above the countertop, the side walls including transparent panels and posts; a shelf supported by the side walls above the cold pan; a housing attached to the posts of the side walls and supported by the side walls above the shelf to enclose a plenum, the housing having inlet and outlet openings; front and back walls extending between the shelf and housing and between the side walls, so that the front and back walls together with the housing, shelf and side walls enclose a warm compartment, the front wall being pivotal about an axis that is fixed with respect to the side walls; and a heating element in the plenum of the housing for elevating the temperature of air that passes into the plenum at the inlet opening thence through the plenum, and then out the plenum at the outlet opening.

6. A merchandiser according to claim 1 wherein one of the second wall extends horizontally below the second compartment where it serves as a shelf that isolates the second compartment from the first compartment.

7. A merchandiser according to claim 1 wherein one of the second walls extends across the top of the second compartment where it forms a housing that encloses a plenum, the housing containing an intake opening and at least one discharge opening spaced from the intake opening; and wherein the heating unit includes a fan located in the plenum to draw air from the second compartment into the plenum through the intake opening and to direct it to the discharge opening through which it is discharged into the second compartment, and a heating element located in the plenum for heating the air in the plenum.

8. A merchandiser according to claim 6 wherein among the second walls are side walls which rise upwardly from walls of the first compartment and close the sides of the second compartment.

9. A merchandiser according to claim 8 wherein the side walls that are among the second walls included posts.

10. A merchandiser according to claim 8 wherein the side walls are transparent, and further comprising lamps located along the surfaces of the side walls that are presented away from the compartments, whereby the lamps illuminate the compartments through the side walls.

11. A merchandiser according to claim 9 wherein the side walls also include transparent panels that rise from the first walls to the second compartment and afford observation of the first and second compartments through the panels.

12. A merchandiser according to claim 9 wherein the second walls include a housing supported on the posts; and wherein the hearing unit includes a fan located in the housing for withdrawing air from the second compartment and discharging it back into the compartment and a heating element located in the housing beyond the fan and in the path of the air discharged from the fan.

13. A merchandiser according to claim 12 wherein the refrigeration unit includes evaporator coils located at least along some of the first walls.

14. A merchandiser according to claim 2 wherein the inlet opening of the housing is located generally midway between the end of the housing and opens downwardly into the warm compartment; wherein the outlet openings are on both sides of the inlet opening and open downwardly into the warm compartment; wherein two heating elements are located in the housing on each side of the inlet opening; and wherein the fan is located at the inlet opening.

15. A merchandiser according to claim 2 wherein the front wall of the closure assembly is transparent.

16. A merchandiser according to claim 2 wherein the vertical walls of the cold pan include side walls and front and back walls extended between the side walls; and wherein the side walls of the closure assembly are spaced apart a distance generally corresponding to the spacing between the side walls of the cold pan.

17. A merchandiser according to claim 2 having a front and a back; and wherein the cold compartment is accessible from both the front and the back of the merchandiser.

18. The combination according to claim 2 wherein the merchandiser has front and a back; and wherein the cold compartment is accessible from both the front and the back of the merchandiser.

19. A merchandiser according to claim 15 wherein the side walls of the closure assembly includes posts which extend upwardly from the cold pan and are attached to the housing; and wherein the side walls of the closure assembly further including transparent panels through which one can observe the cold compartment.

20. A merchandiser according to claim 19 and further comprising lamps located along the surfaces of the side walls that are presented away from the compartments, whereby the lamps illuminate the compartments through the side walls.

21. The combination according to claim 3 wherein the side walls are attached to the cold pan and include transparent panels.

22. The combination according to claim 3 wherein the cold pan has vertical walls and a bottom wall at the lower ends of the vertical walls; and further comprising a refrigeration unit located within the counter and including an evaporator coil located along at least one of the walls of the cold pan, the evaporate coil forming the conduit.

23. The combination according to claim 21 wherein the side walls also include posts to which the housing is attached.

24. A merchandiser according to claim 4 wherein the back wall of the closure assembly moves and is hinged with respect to the side walls.

25. The combination according to claim 5 wherein the back wall pivots about an axis that is fixed with respect to the side walls.

*26. A merchandiser for displaying foods, said merchandiser comprising a cold pan having vertical walls that surround a cold compartment and a bottom wall connected to the vertical walls and extending across the bottom of the cold compartment; a closure assembly located above the cold pan and including spaced apart side walls rising upwardly from the cold pan, a shelf supported on the side walls above the cold compartment and spaced from the bottom wall of the cold pan, a housing supported on the side walls above the shelf and enclosing a plenum, the housing containing an inlet opening and an outlet opening, a front wall and a back wall extending between the side walls and between the shelf and housing, so that the front and back walls together with the shelf, the housing and the side walls enclose a warm compartment into which the openings in the housing open, at least one of the front and back walls being movable to provide access to the warm compartment; a heating unit including a fan located in the plenum of the housing for withdrawing air from the warm compartment through the inlet opening and discharging it back into the warm compartment through the outlet opening, and a heating element located in the plenum for heating the air as it passes through the plenum; and a refrigeration unit comprising a conduit along at least the bottom wall of the cold pan.*

*27. A merchandiser as set forth in claim 26 wherein said merchandiser rests on a counter with the warm compartment elevated above the counter.*

*28. A merchandiser as set forth in claim 26 wherein the bottom wall of said cold pan is refrigerated and spaced below said shelf.*

*29. A merchandiser as set forth in claim 28 wherein said refrigeration unit comprises a compressor and condenser mounted outside said cold compartment, and a refrigeration conduit for cooling said bottom wall of the cold pan.*

*30. A merchandiser as set forth in claim 26 wherein the warm compartment has a top closed by said housing.*

*31. A merchandiser as set forth in claim 26 wherein said front wall is inclined.*

*32. A merchandiser as set forth in claim 26 wherein said side walls comprise upright posts adjacent the rear of the merchandiser.*

*33. A merchandiser as set forth in claim 32 wherein said shelf comprises a top panel, a bottom panel, and thermal insulation between the top and bottom panels.*

*34. A merchandiser as set forth in claim 26 wherein said shelf comprises a top panel, a bottom panel, and thermal insulation between the top and bottom panels.*

*35. A merchandiser as set forth in claim 26 wherein the front, back and side walls defining said warm compartment are transparent.*

*36. A merchandiser as set forth in cain 35 further comprising at least one lamp located adjacent a side wall for illuminating said warm compartment.*

*37. A merchandiser as set forth in claim 26 wherein said back wall comprises a door providing access to the warm compartment.*

*38. A method of merchandising food, said method comprising the steps of:*

*displaying warm and cold food in a merchandiser, said merchandiser having front, back and sides, a cold compartment in the merchandiser, a refrigeration unit for cooling food in the cold compartment, a shelf above the cold compartment for displaying food and defining, in part, a warm compartment above the cold compartment, a heating unit for heating food in the warm compartment, said merchandiser having front, back and side walls defining said cold and warm compartments, at least some of said walls being transparent for allowing food within the compartments to be observed, and said back wall comprising a door movable to provide access to said warm compartment,*

*operating the refrigeration unit to cool food in said cold compartment,*

*operating said heating unit to heat food in said warm compartment, and*

*wherein the food in said cold and warm compartments is displayed through the transparent walls of the merchandiser as the food is being cooled and heated.*

*39. A method as set forth in claim 38 wherein the front wall of the merchandiser is transparent, and wherein said displaying step comprises placing food in respective warm and cold compartments such that the food is displayed through the transparent front wall.*

*40. A method as set forth in claim 38 wherein said displaying step comprises resting said merchandiser on a counter.*

*41. A method as set forth in claim 40 wherein said displaying step further comprises fitting said merchandiser in a cutout in the counter.*

*42. A method as set forth in claim 38 further comprising removing food from the cold compartment through a doorless opening in the back of the merchandiser.*

* * * * *